Figure 1:
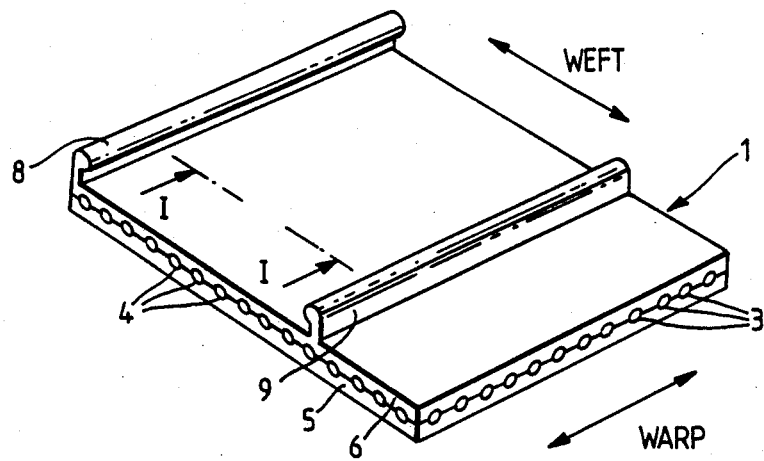

United States Patent [19]

Jones et al.

[11] Patent Number: 4,816,326

[45] Date of Patent: Mar. 28, 1989

[54] ARTICLE COMPRISING FIBRE

[75] Inventors: Thomas P. H. Jones, Cirencester; Frank J. Lowe, Swindon, both of United Kingdom

[73] Assignee: Raychem Corporation, Menlo Park, Calif.

[21] Appl. No.: 864,691

[22] Filed: May 19, 1986

[30] Foreign Application Priority Data

May 20, 1985 [GB] United Kingdom ............ 8512699

[51] Int. Cl.⁴ .................................... B05D 3/08
[52] U.S. Cl. ............................ 428/224; 428/34.9; 428/225; 428/227; 428/228; 428/229; 428/257; 428/258; 428/259; 428/264; 428/910; 428/34.5; 428/35.1; 156/86; 156/272.2; 264/147
[58] Field of Search ............... 428/227, 228.36, 229, 428/264, 913, 257, 258, 259, 910, 224, 225; 57/907; 264/147; 156/86, 272.2

[56] References Cited

U.S. PATENT DOCUMENTS

| | | | |
|---|---|---|---|
| 2,027,962 | 1/1936 | Currie | 29/447 |
| 3,086,242 | 4/1963 | Cook et al. | 264/209.1 |
| 3,503,106 | 3/1970 | Port et al. | 57/907 |
| 3,597,372 | 8/1971 | Cook | 524/467 |
| 3,669,157 | 6/1972 | Woodall, Jr. et al. | 138/123 |
| 3,966,865 | 6/1976 | Nishida et al. | 264/147 |
| 3,981,952 | 9/1976 | Ruddell et al. | 264/147 |
| 4,018,733 | 4/1977 | Lopez et al. | 524/357 |
| 4,168,298 | 9/1979 | Fitzgerald | 428/362 |
| 4,181,775 | 1/1980 | Corke | 524/602 |
| 4,421,582 | 12/1983 | Horsma et al. | 428/36 |
| 4,576,666 | 3/1986 | Harris et al. | 428/36 |
| 4,624,720 | 11/1986 | Pithouse et al. | 428/257 |
| 4,624,879 | 11/1986 | Van Dijck et al. | 428/102 |
| 4,626,458 | 12/1986 | Pithouse et al. | 428/36 |
| 4,631,098 | 11/1986 | Pithouse et al. | 428/257 |
| 4,639,545 | 1/1987 | Pithouse et al. | 428/259 |
| 4,668,545 | 5/1987 | Lowe | 428/188 |

FOREIGN PATENT DOCUMENTS

| | | |
|---|---|---|
| 1555470 | 6/1969 | United Kingdom . |
| 1440524 | 6/1976 | United Kingdom . |
| 2104800 | 3/1983 | United Kingdom . |
| 2134334 | 8/1984 | United Kingdom . |
| 2135632 | 9/1984 | United Kingdom . |
| 2135836 | 9/1984 | United Kingdom . |

Primary Examiner—Sharon A. Gibson
Attorney, Agent, or Firm—A. Stephen Zavell; Herbert G. Burkard

[57] ABSTRACT

A cross linked film fibre is made by slitting or splitting polymeric film. In a preferred embodiment the fibre is made into a fabric which is impregnated with a polymeric matrix material. The matrix is preferably also cross-linked, this being done at the same time, or separately from, cross-linking of the fibre. The preferred embodiment is particularly useful for enclosing a substrate.

11 Claims, 1 Drawing Sheet

ARTICLE COMPRISING FIBRE

This invention relates to fibrous materials and to articles for environmental sealing, particularly recoverable articles, made from them.

A recoverable article is an article the dimensional configuration of which may be made substantially to change when subjected to a particular treatment for example heat treatment. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One method of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape. A further method comprises deforming a substantially non-crosslinked polymeric material at a temperature below the crystalline melting point or softening point of the material, fusing together parts of the material or a part or parts of the material and at least one other polymeric component to produce the configuration of at least one hollow heat-recoverable article and subsequently cross-linking the substantially non-cross-linked material.

In other articles, an elastomeric member is held in a stretched state by a second member, which, upon heating weakens and thus allows the elastomeric member to recover. Heat-recoverable articles of this type are described, for example, in British Pat. No. 1,440,524 in which an outer tubular elastomeric member is held in a stretched state by an inner tubular member.

Heat-recoverable articles have found particular use in the environmental protection of elongate substrates such as for example splices in telecommunication cables.

In addition to making the environmental seal the sleeve may be required to withstand an internal pressure, either because the complete splice enclosure is pressure tested for leaks, as for example in the Bell cycle and British Telecom specifications, or because temperatures reached in service create a significant internal pressure. Whereas the known heat-recoverable sleeves are quite suitable for the conditions encountered with distribution splice enclosures, many larger telecommunication cables are internally pressurised to exclude moisture and the thicker-walled sleeves which would be required to withstand such pressures long term are more difficult and expensive to manufacture and require greater skill to install in the field.

It has been proposed, in U.S. Pat. No. 3,669,157 to Carolina Narrow Fabric Company and in Japanese Pat. No. 53-13805 to Matsushita, to provide heat-shrinkable tubular fabric articles which may be impregnated with certain thermosetting resins. However, we have found that the articles disclosed therein are very difficult to install because they are subject to displacement of the resin on recovery, resulting in burst-through of fabric by the resin, or delamination of the resin from the fabric. Thus these prior art articles are of limited utility and are too craft-sensitive for use in most telecommunications applications.

We have now discovered a fibre that can be used to produce, for example by weaving, an article useful for environmental sealing in the telecommunications and other industries.

Thus, the invention provides a cross-linked film fibre.

A BRIEF DESCRIPTION OF THE DRAWING

FIG. 1 is a perspective view of an article of the invention which is in the form of a wrap-around device.

Film fibres may be produced by any suitable technique from polymeric film, and may be contrasted with spinneret fibre. In general, film fibre is produced by slitting or splitting a film, preferably a stretched film and the resulting fibre will generally have a rectangular cross-section.

A preferred technique is roll-embossing such as that used in the REF process of Shell, or Smith and Nephew. Other techniques include film embossing using a profiled die, such as in the Barfilex process, and pin fibrillation.

The cross-linked film fibre may be formed into multifilament bundles, alone or with other fibres. The bundles preferably are of 30–2000 tex, more preferably of 200–600 tex, especially about 450 tex. The fibres within the bundle may be held together by the bundle being twisted for example from 0.05 to 5, expecially about 0.25, turns per cm. The number of fibres within each bundle is not critical and further splitting of fibres may occur during processing and use of the fibres. Typical numbers may be from 2–500, preferably from 20–200, especially about 50.

A fabric may be made from the film fibres or from the multi-filament bundles by any suitable technique. For example weaving or knitting (optionally with weft or warp insertions) or by a stitch bonding technique such as the Malimo process. Weaving is, however, preferred and we prefer the resulting fabric to be dimensionally recoverable due to the film fibres or bundles being recoverable. The film fibres or bundles preferably constitute one of the warp and the weft and a strength fibre, for example glass fibre or Kevlar (trade mark) preferably constitutes the other of the warp and weft.

Recoverability allows the resulting fabric to be made to engage tightly a substrate to be environmentally protected. The fabric may be provided with a closure means whereby it can be held in engagement with the substrate or whereby it can be maintained in a wrapped around configuration around the substrate. Thus, the fabric may be in sheet form having closure means adjacent opposing edges and can be wrapped around a substrate and held in place during recovery.

If recovery is to cause the wrap-around fabric to engage the substrate it will be necessary that recovery occurs in a direction perpendicular to the closure means. We have discovered a way of making a recoverable fabric whereby this direction of recovery between opposing closure means can be conveniently provided.

We prefer therefore that a fabric be woven with a strength fibre in the warp (ie machine) direction and weft insertions be made of recoverable fibres. This allows a closure means to be incorporated in the fabric to produce a radially recoverable wraparound article, by a continuous in-line technique. If fine monofilaments were used as the weft, production would be very slow due to the high weft desities desirable in a fabrics for environmental sealing. We have discovered several ways around this problem including the use of broad tapes as the weft, using heavier monofilaments, using multi-filament yarns of normal spinneret fibre, and the multiple insertion of separate monofilaments at each warp insertion; the preferred technique however is to employ multi-filament bundles of film fibre. Such film fibre is preferably cross-linked and such cross-linking may be carried out before weaving or after weaving. Such bundles are highly flexible and can contain the desired bulk of fibre. The bundles can deform or flatten as necessary on weaving, to produce a flat smooth fabric. Weaving can be carried out uniformly, and the fabric can be made recoverable if the film fibres are themselves recoverable.

The heat-recoverable fibres used in the article of the invention preferably have a minimum recovery stress of $10^{-1}$ MPa, more preferably $5 \times 10^{-1}$ at a temperature above the transition temperature of the fibres. There is in theory no upper limit of recovery stress. In practice the usual recovery stress achieved is in the range 0.1 to 10 MPa.

The fibres are preferably formed from a polymeric heat-recoverable material. By "the recovery temperature" of polymeric heat-recoverable materials is meant that temperature at which the recovery of the polymeric material will go substantially to completion. In general, the recovery temperature will be the crystalline melting transition temperature if the polymer is crystalline or the glass transition temperature if the polymer is amorphous.

In most forms of article according to the invention the polymer matrix will become soft at temperatures below the recovery temperature of the heat-recoverable fibres so that the temperature (T) at which the matrix material has the required elongation and secant modulus and at which the inequality (1), referred to hereinafter, is satisfied will be the same as the recovery temperature of the fibres. The invention includes, however, those cases in which a rigid matrix material holds out the fibres against recovery over a temperature range above the recovery temperature of the fibres and then softens so that the fibres can recover.

The heat-recoverable fibres are preferably formed from a polymeric material that imparts good physical properties and, in particular, good creep resistance to the fibres. Olefin polymers, for example a polymer that comprises an ethylene polymer such as polyethylene and ethylene copolymers, polyamides, polyesters, acrylic polymers and other polymers may be employed and prefer-ably those that are capable of being cross-linked. A particularly preferred polymeric material for the fibres is based on polyethylene having a density of from 0.94 to 0.97/gms/cc, a weight average molecular weight Mw of from $80 \times 10^3$ to $200 \times 10^3$ and a number average molecular weight Mn of from $15 \times 10^3$ to $30 \times 10^3$. Another preferred polymeric material for the fibres is based on polyethylene having a desnity of from 0.91 to 0.94/gms/cc, a weight average molecular weight, Mw of from $13 \times 10^3$ to $80 \times 10^3$, and a number average molecular weight, Mn, of from $4 \times 10^3$ to $30 \times 10^3$.

Preferably the recovery temperature of the fibres if 70° C. or more, most preferably from 80° C. to 250° C., such as, for example, 100°-160° C.

When the fibre is cross-linked by irradiation it is convenient to incorporate the cross-linking step into manufacture of the fibre. The film from which the fibre is made can be extruded, stretched at a temperature below its melting temperature, optionally as part of the splitting process, preferably by an amount of from 500 to 2000%, then subjected to irradiation to effect cross-linking. Another way of making the fibre is to extrude the film material, irradiate to cross-link, then heat the material, preferably to above its melting tem-perature, stretching the material, and then cooling the stretched material. High density polyethylene fibres are preferably irradiated with a dose of from about 5 to about 35 megarads, preferably from about 5 to about 25 megarads and in particular from about 7 to about 18 megarads, especially from 10 to about 18 megarads. Preferably the gel content of the cross-linked fibre is greater than 10%, more preferably greater than 20 %, most preferably greater than 40%. In practice, gel contents greater than 90% are not easily achievable. Fibres produced in this way can have a high strength after recovery. A further advantage of fibre irradiation will be mentioned below in connection with lamination.

The heat-recoverable fabric can, if desired, be made solely of heat-recoverable fibres as described above or can contain other fibres in addition to the heat-recoverable fibres. The fabric can be knitted, woven, non-woven, braided, or the like. The recoverable fibres can form part of the fabric itself as it is made or may be additional and inserted after production of the basic fabric. In a preferred embodiment the fabric is a woven fabric. The woven fabric can contain only heat-recoverable fibres or it can contain heat-recoverable fibres together with non-heat-recoverable fibres or filaments. The fabric can be woven in a pattern, for example, twill, broken twill, satin, sateen, Leno, plain, hop sack, sack and various weave combinations, in single or multiple ply weaves for example two or three ply weaves. Preferably the fabric is a woven fabric having a warp and weft density each of 2 to 80 fibres per cm. Preferably the woven fabric has heat-recoverable fibres in one direction and dimensionally heat stable fibres in the other direction so that the fabric as a whole is recoverable in a single direction only, and the description below will, in general, be made in terms of such a fabric. However, the features described may be applied to other fabrics.

Preferably the fabric comprises glass fibres. In a preferred embodiment there are from 2 to 40 glass fibres per cm. Preferably the glass fibres are of from 11-2000 tex. The glass fibres may advantageously provide non recoverable fibres in the fabric, where these are desired.

The fabric may alternatively be knitted if desired, either warp knitted or weft knitted. If the fabric is made solely from heat-recoverable fibres it will be recoverable in two dimensions, but if, as is preferred for the knitted fabrics, it is knitted from a heat stable fibre and a heat-recoverable fibre is either warp or weft inserted, it will be recoverable in only one direction.

The heat-recoverable fabric is preferably bonded to, and preferably embedded in, a polymer matrix material to produce a composite material. Recoverable composite materials are discussed in UK patent publication No. 2135632, to which the reader's attention is drawn. If the fibres, before or after formation of the fabric are irradiated (particularly in the presence of oxygen), a chemical change to their surface occurs which significantly improves bonding of the matrix material. At or above the recovery temperature of the fibres the polymer matrix material should be capable of limited flow under pressure so that it retains the integrity of the composite structure without substantially impeding recovery of the fibres. It preferably has, at the aforesaid temperature, an elongation to break of greater than 50%, most preferably greater than 100% particularly 400–700%, and a 20% secant modulus of preferably at least $5 \times 10^{-2}$ MPa, most preferably at least $10^{-1}$ MPa, measured at a strain rate of 300% per minute.

The specified properties of the polymer matrix material need not necessarily apply after recovery although it may be desirable that the product be flexible at room temperature.

We prefer a viscosity at 200° C., or during recovery, of from $5 \times 10^2$ to $3 \times 10^8$, more preferably from $10^4$ to $5 \times 10^5$, especially about $8 \times 10^4$, poise, measured at a shear rate of 1 radian per second using a 10% dynamic strain. These figures were obtained using a Rheometrics Dynamic Spectrometer. Thus, for example, the polymer matrix material may eventually cure to a thermoset on heating, provided that the cure rate is sufficiently slow under the recovery conditions not to affect adversely the above mentioned physical properties of the polymer matrix material during the recovery of the fibres. Thus, for example, the polymer forming the matrix material may contain grafted hydrolysable silane groups which are capable of crosslinking the material subsequently in the presence of moisture. Alternatively the matrix material may include a polymer, preferably a rubber and especially an acrylic rubber, which contains epoxy groups and at room temperature insoluble curing agent e.g. dicyandiamide.

The polymer matrix material can be either a thermoplastic or an elastomer. In general, we prefer that the polymeric matrix material and the material of the recoverable fibres be chemically or physically compatible, and preferably both chemically and physically compatible. By this we mean that they be of similar or identical chemical types and that their relevant physical properties during lamination, installation and use be similar or identical. In particular we prefer that the matrix and fibres be low density polyethylene and high density polyethylene respectively. The skilled man will be able to choose other pairs of compatible polymers. Example of thermoplastic materials suitable as the matrix material include ethylene/vinyl acetate copolymers, ethylene/ethyl acrylate copolymers, polyethylenes including the linear low, low density and high density grades, polypropylene, polybutylene, polyesters, polyamides, polyetheramides, perfluoroethylene/ethylene copolymer and polyvinylidene fluoride. Considering the second class of materials this can include acrylonitrile butadiene styrene block copolymer, acrylic elastomers including the acrylates and methacrylates and their copolymers, e.g. polybutylacrylate, and poly 2-ethylhexyl acrylate, the high vinyl acetate copolymers with ethylene (VAE's), polynorbornene, polyurethanes and silicone elastomers and the like. The polymeric material forming the matrix may be transparent (at least to visible radiation) or completely opaque or it may have any opacity between these two extremes. If the opacity is increased for example by blending a small quantity eg up to about 5% by weight of carbon black into the matrix, the time taken for recovery appears to be reduced. Also, the resistance of the material to heat damage, especially by flame, and to UV damage is reduced. The matrix material (or part of it) can be cross-linked, for example, a cross-linked ethylene/vinyl acetate copolymer, low density, linear low density medium density, or high density grade polyethylene or an acrylic elastomer. The material can be cross-linked by irradiation or by other means such as chemical cross-linking using, for example, a peroxide cross-linking agent, provided that the physical properties of the matrix at the recovery temperature are as specified after the cross-linking step. Where irradiation is used a dose of 10 megarads or less, in particular from 3–7 megarads, is preferred. The resulting extent of cross-linking allows the matrix to recover with the fabric and also prevents the matrix running or dripping during heat recovery, especially during heat recovery by means of a torch. The recovery ratio of the composite after irradiation is preferably at least 50% especially at least 70% of that before irradiation. These dose values may be regarded as typical for olefinic polymers such as polyethylene of low irradiation, and the skilled man will be able to select suitable dose values depending on the presence of various concentrations of prorads if any. The composite structure may be produced using a single irradiation step if the beam response of the matrix and fibre be made compatible; the beam response of the oriented fibres may be increased by the addition of prorads and that of the less oriented matrix be reduced by the addition there of antirads. Otherwise separate cross-linking steps will be preferred. A further feature of post-lamination cross-linking (particularly by irradiation) is that a cross-link bond may be formed between the recoverable fibres and/or any other fibres which can help to maintain the structure as a true composite, particularly under severe recovery conditions. This may allow a much less severe laminating process, since it can obviate the need for physical interlocking.

The heat-recoverable fabric is preferably bonded to the polymer matrix material, and this bonding may be adhesive, that is to say by chemical or physical surface interaction, or alternatively mechanical interlocking may be provided.

Most preferably, the heat-recoverable fabric is embedded in the polymer matrix material thereby forming a composite structure. By "embedded" is meant that the polymer matrix material surrounds at least a major portion of the fibre surface area of the fibres making up the fabric.

The fibres are preferably totally surrounded by polymer matrix material; however, it is possible and at times desirable, that substantially less than the total fibre surface area be surrounded by polymer matrix material. An instance where this is possible is where a fibre-matrix bond is formed. Sufficient fibre area should be bonded to the polymer matrix material or interlocked therewith to result in a composite material which retains its integral structure during recovery of the article. For the avoidance of doubt it is here stated that the term matrix is used to include materials which surround (partially or totally) the fibres and also those materials which are merely affixed to a surface of the fabric but do not penetrate the interstices of the fabric.

Preferably the polymer matrix material at least on the surface of the composite structure facing the source of heat is substantially unstressed and has a thickness of at least 0.03 mm especially at least 0.01 mm, more especially at least 0.2, particularly from 0.2 to 2 mm as described in UK patent publication No. 2139142, as this improves the ability of the composite material to be heat recovered using a conventional propane torch.

In the composite material, the ratio of the volume occupied by the heat-recoverable fibres of the fabric to the total volume of the composite is at least about 0.01:1, preferably from about 0.1:1 to about 0.8:1 and most preferably from about 0.2:1 to about 0.4:1.

In the composite material the heat-recoverable fibre volume in any given unit volume of composite is dependent on the fibre strength, polymer matrix strength and the integrity of the fibre/polymer matrix structure under recovery conditions. We have found that an acceptable recoverable product results if the inequality (1) is satisfied:

$$\frac{X}{Y} \frac{(1-R)}{R} < 1 \qquad (1)$$

wherein X is the 20% secant modulus of the polymer matrix material and Y is the recovery stress of the fibres, both at a temperature T above the recovery temperature of the fibres, and R is the mean effective volume fraction of heat-recoverable fibres in the composite structure.

Preferably $$\frac{X}{Y} \frac{(1-R)}{R} < 0.5 \text{ most preferably} < 0.05.$$

The composite material can be formed for example by laminating one or more layers of polymer matrix material to the heat-recoverable fabric. Sufficient heat and pressure is preferably applied so that at least a major part of the fabric is bonded to the polymer matrix material, or so that a significant amount of mechanical interlocking occurs. The result is a composite structure which on application of heat recovers as a unit.

Other methods of bonding the fabric to the matrix can be used, for example, impregnation, solution coating, slurry coating, powder coating, reactive prepolymers, e.g. acrylic prepolymers activated by UV or peroxide, and the like. In any bonding method employed sufficient heat to cause the fabric to recover to any significant extent should be avoided, unless the fabric is suitably restrained from recovery.

The heat-recoverable fabric or composite structure can be used in numerous applications. It is particularly suitable for enclosing elongate substrates such as pipes, pipe joints, conduits, cables, cable splices and the like. The invention also provides a cable, cable splice, pipe or pipe joint environmentally sealed by a composite material according to the invention. Such a heat-recoverable article can be coated on a surface thereof with a layer of a sealant or adhesive composition. The sealant can be a mastic and the adhesive can be a heat activatable adhesive such as a hot-melt adhesive. Hot-melt adhesives which can be used include polyamide and ethylene-vinyl acetate copolymer based adhesives.

Such adhesives are well known, for example see U.S. Pat. Nos. 4,018,733, 4,181,775. If desired a heat-curable adhesive may be used for example as described in U.K. patent publication No. 2104800.

The invention also provides a method of producing an article for environmentally sealing a substrate, which comprises:

(a) weaving a fabric from a warp comprising a first fibre and a weft comprising a film fibre;

(b) applying to the resulting fabric a matrix material; and (c) cross-linking the film fibre and/or the matrix material.

In preferred embodiments the film fibre is a fibre according to the invention, or a bundle of fibres according to the invention, and/or the first fibre comprises glass fibre.

By appropriate selection of the polymer matrix material, the polymer matrix material can function as an adhesive to secure and seal the recovered composite material to the substrate. The fabric can be embedded in more than one polymer matrix material to provide desired properties. For use in enclosing elongate substrates, the fabric can be laminated with a layer of matrix material on each of its surfaces, the surface which will be the inner surface when in use can be laminated to a polymer matrix material which has adhesive properties while the outer surface can be laminated to a material which does not. As will be readily apparent the matrix material can be selected for various other desirable properties inherent in the polymer material inself or provided with various additives such as antioxidants, ultra violet stabilizers, pigments, anti-tracking agents and the like.

The heat-recoverable fabric or composite material is typically a sheet but can be of any configuration such as tubular, including multiple tubular portions interconnected, for example, a break-out structure for cable splices where one cable is spliced to two or more other cables, or where two or more pipes are joined together.

A heat-recoverable fabric or composite material in accordance with this invention can be used to form a cable splice case, a pipe segment, or pressure vessel as described in UK patent publication No. 2135836. Such heat recoverable articles have been found to be particularly suitable for use in enclosing a splice between pressurised and non-pressurized telecommunication cables. The recovered article is exceptionally resistant to the effects of pressure and preferred embodiments are impervious and have sufficient hoop strength to resist rupturing under about 70 KPa pressure (the pressure typically used in pressurized telecommunication systems) at the operating temperatures of such systems.

Where a cable splice case is to be formed, the fabric or composite material of the invention may be used in sleeve form in conjunction with some kind of internal support, such as a generally cylindrical liner having tapered ends. The liner is preferably shaped in this way such that its larger central section fits around the bulky cable splice, and its tapered ends accomodate the transition in size down onto the cables. The liner may be of the wrap-around type, in which case it preferably comprises half-shells having crowned or other end supports, or it comprises a sheet of stiff material which may be rolled around the cable splice and again crowned ends may provide the end supports which can be taped down onto the cables. In this way, a pressure vessel may be built around an object (such as a cable splice); the fabric or composite material providing an impermeable, creep resistant and split resistant surround, and the liner providing impact resistance, axial strength and satisfying other mechanical requirements.

If the splice case or pressure vessel is intended to retain pressure during use, rather than merely be pressure tested for integrity before use, certain other features may be provided. A valve or other pressure access point will be usefully provided in the recoverable sleeve, and may also be affixed to the internal liner. A sleeve based on fabric is well suited to the provision of a valve or other device which must pass though the sheet, since splitting is less likely to occur. Even if some fibres are broken when the valve is inserted, the damage should not spread, and if care is taken a hole for the valve may be produced simply by moving adjacent fibres apart.

A second feature desirable in a pressurized splice case is some means for preventing any bond between outer sleeve and cable being put into peel by the internal pressure. We have obtained satisfactory results using a strip of material having one surface which abuts (and preferably bonds to) the cable and another surface which abuts (and preferably bonds to) the sleeve, such that the two surfaces can open out. The strip of material preferably has a U- or V-shaped cross-section and is installed with the re-entrant side facing into the splice case.

Other uses for the composite structure include environmental protection or repair or insulation of a wide range of substrates in the telecommunications, high voltage, electronic, oil and gas, and process industries. For example in addition to the production of cable splice cases, cables jackets may be repaired by the installation of the new composite, with particular benefit due to its high strength, flexibility and abrasion resistance. Also, pipes may be protected from corrosion or other damage, in which case a sealant, particularly a mastic, coating on the composite is desirable. Pipe insulation can also be built up by means of the composite, optionally with some other insulation material such as a foaming material. Thermal and/or electrical insulation may be provided.

A further use for the composite is in the production of hollow articles for housing and protection of a wide variety of components.

Yet another use of the composite is for securing together two or more articles, for example a pipe or a cable onto an elongate substrate. Where pipes or cables have to be held secure under adverse conditions some tight and environmentally resistant fixing is needed.

For many uses, the recoverable composite structure of the invention is preferably produced open as opposed to tubular. A sheet is easier to manufacture that way, and also easier to install since a free end of the substrate to be covered need not be accessible. The problem that results, however, is how to secure the sheet in the wrapped configuration around the substrate; what is required is some means whereby the recoverable fibres at opposing edges of the sleeve be trapped together. The solutions can be regarded as of four broad types. Firstly a lap or other bond may be made between opposing edges of the sheet, optionally with a patch to prevent peel-back of the overlapping edge on recovery. Here the bond will generally be between the matrices of the opposing edge portions, and one must therefore ensure that the fibre recovery force is properly transmitted from the fabric to the matrix at those edges. Secondly some means which penetrates the sheet may be used, and here the fabric will be directly involved. In general, this technique was not possible with continuous sheet materials due to the problem of splitting. With a fabric based material, however, split resistance may be extremely high. Examples of this type of closure include stitching, stapling, riveting, the use of pre-inserted catches such as press-studs or the use of means which may be positioned adjacent a lap joint in the sheet and which has a plurality of projections which penetrate both thicknesses of sheet. This second type is mentioned in more general terms below. The third broad type of closure involves forming or building up opposing edge portions of the sheet in order that they may be held together by some form of clamping means such as a channel of C-shaped cross-section or by a re-usable tool. This may be achieved by bonding material to the edge portions or by folding the edge portions back on themselves (optionally around a rod running lengthwise of the sheet). The resulting edge portions of the sleeve may then have a shape similar to the rails of the classic rail-and-channel closure disclosed in UK Pat. No. 1155470.

The fourth technique to be mentioned comprises forming the fabric in such a way that the recoverable fibres do not terminate at the opposing edges to be joined, but instead double-back. An example is to use recoverable weft on a shuttle loom and insert a closure member into the weave at each edge, or to employ special selvedges. A further possibility is to weave closed pockets at each edge, or to weave a tubular structure and flatten the tube, the flattened tube then being used as a sheet which can accommodate closure rods or other members within it. These ideas, although mentioned in terms of weaves, apply mutatis mutandis to other fabrics such as braids and knits.

Several of the above closure techniques are described in UK patent publication No. 2134334.

Where the recoverable sheet of the invention is used in the wrap-around form, it may be desirable to employ a flap under the opposing edges which are brought together. Such a flap, which may be integral with the sheet, will improve environmental sealing and if need be pressure retention.

Usually, it will be necessary only for the composite material to contain a single fabric embedded in or bonded to the matrix polymer. However it is quite possible, and in some instances it may be desirable, for the composite material to comprise a plurality of fabrics, e.g. two fabrics having a layer of the matrix polymer therebetween, and optionally on one or more of the outwardly facing surfaces. Articles that employ more than the one fabric are especially useful for enclosing substrates that have high internal pressures or for use in cases in which the article may be subject to particularly severe mechanical abuse.

The invention is further illustrated, by way of example, by the accompanying FIGURE, which is a perspective view of a wrap-around article according to the invention with the thickness of the composite structure exaggerated for the sake of clarity.

The FIGURE shows in perspective an article according to the invention which is in the form of a wrap-around device suitable for enclosing an elongate substrate such as a splice in a telecommunications cable. The article is formed from a composite material 1 comprising a fabric having bundles of heat-shrinkable film fibre 3 in the weft direction and multifilament glass yarn 4 in the warp direction. The fabric preferably has a warp and weft density each of from 2–80 fibres per cm. More preferably, the glass is present at a density of from 2–40 fibres per cm and as fibres of from 11–2000 tex.

The composite material has a matrix comprising a laminate 6 of a thermoplastic polymer such as polyethylene or EVA, the laminate having been laminated onto one (or both) sides of the fabric e.g. by a melt lamination process and subsequently cross-linked so that the laminate adheres to the fabric, and so that it exhibits the desired flow characteristics under the chosen recovery conditions. An adhesive layer or sealant 5 may be provided on the other surface. After the composite material has been formed, a rail 8,9 is formed along each of the edges that extend along the warp direction in order to provide means for retaining those edges together after the article has been wrapped around a substrate. Rail formation may be in-line and continuous with lamination, and optionally also with weaving. The composite material 1 is provided with the layer 5 of sealant or adhesive, e.g. a mastic or a hot melt adhesive before or after rail formation. The article has been found to have significant advantages over prior art articles. Its ability to withstand hoop stress, resulting for example from internal pressure is higher; it can be heat-shrunk using a torch with reduced liklihood of damage, it is abrasion resistant; and it is highly split resistant.

We claim:

1. A dimensionally recoverable fabric which comprises dimensionally-recoverable cross-linked film fibres in one direction and non-recoverable fibres in another direction.

2. A fabric according to claim 1, in which the non-recoverable fibres comprise glass fibres.

3. A fabric according to claim 1, in which the film fibres are present as multi-filament bundles.

4. A fabric according to claim 1, in which the film fibres comprise polyethylene.

5. A fabric according to claim 3, in which the bundles are of from 200–600 tex.

6. A fabric according to claim 1, which comprises a weave having a weft of said film fibres and a warp of said non-recoverable fibres.

7. A fabric according to claim 1, provided with a closure means whereby it can be maintained in a wrapped around configuration around the substrate.

8. A fabric according to claim 1, in which the film fibres have a recovery stress of from 0.1 to 10 MPa.

9. A fabric according to claim 1, having bonded thereto a polymer matrix material.

10. A fabric according to claim 1, which is embedded within a polymeric matrix material.

11. A fabric according to claim 9, in which the matrix material is cross-linked.

* * * * *